H. L. HARTENSTEIN.
METHOD OF MAKING CALCIUM CARBID.
APPLICATION FILED NOV. 30, 1906.
966,542.
Patented Aug. 9, 1910.
2 SHEETS—SHEET 1.
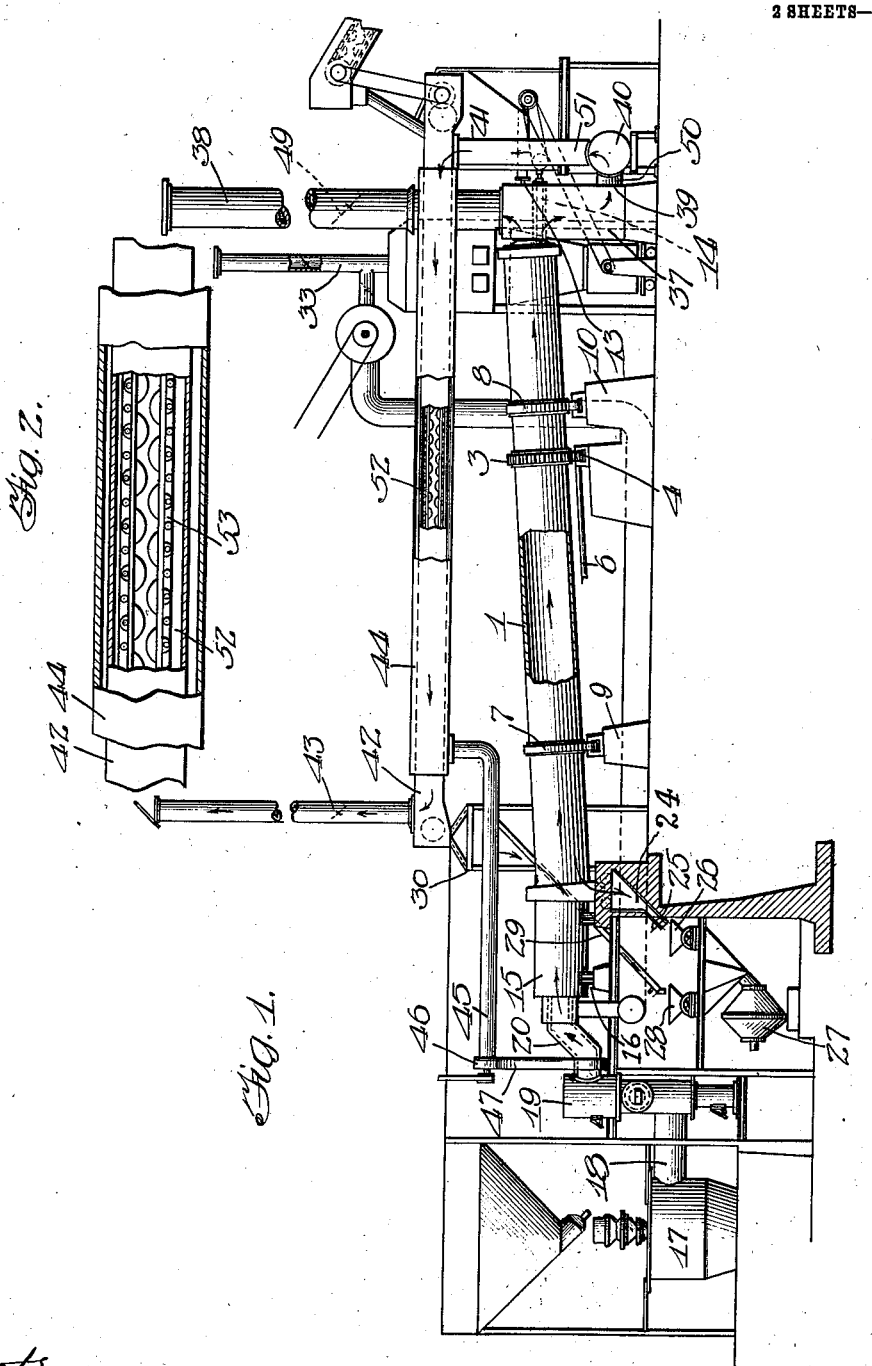

H. L. HARTENSTEIN.
METHOD OF MAKING CALCIUM CARBID.
APPLICATION FILED NOV. 30, 1906.
966,542.
Patented Aug. 9, 1910.
2 SHEETS—SHEET 2.
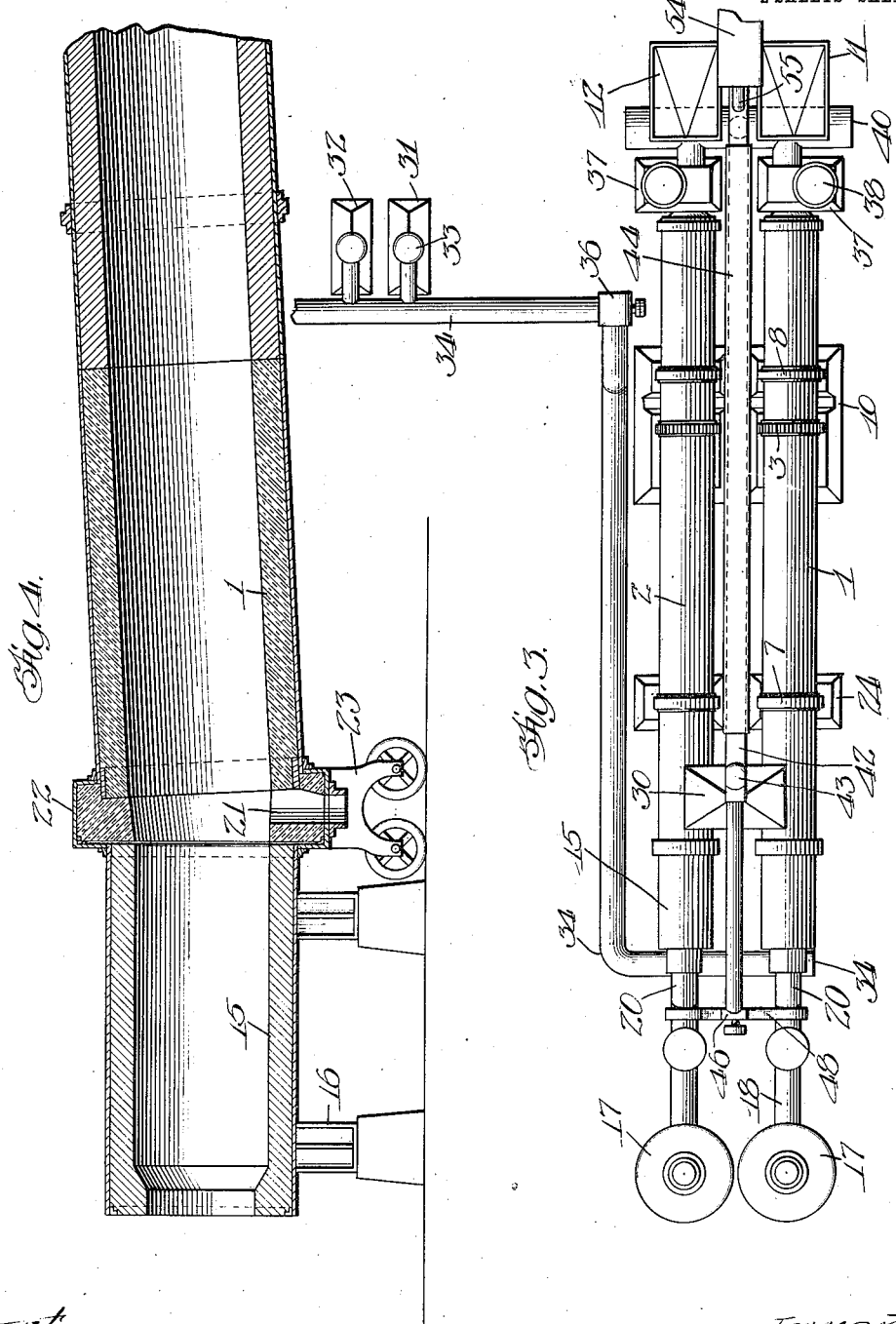

UNITED STATES PATENT OFFICE.

HERMAN L. HARTENSTEIN, OF CONSTANTINE, MICHIGAN, ASSIGNOR, BY MESNE ASSIGNMENTS, TO CONTINENTAL INVESTMENT COMPANY, OF DULUTH, MINNESOTA, A CORPORATION OF MINNESOTA.

METHOD OF MAKING CALCIUM CARBID.

966,542.  Specification of Letters Patent.  Patented Aug. 9, 1910.

Application filed November 30, 1906. Serial No. 345,607.

*To all whom it may concern:*

Be it known that I, HERMAN L. HARTENSTEIN, a citizen of the United States, residing at Constantine, in the county of St. Joseph and State of Michigan, have invented certain new and useful Improvements in Methods of Making Calcium Carbid, whereof the following is a full, clear, and exact specification.

This invention relates to methods of making calcium carbid; and it comprises a process of producing calcium carbid wherein the waste combustible gases and heat of the carbid furnace are utilized in preparing the materials to be introduced thereinto; all as more fully hereinafter set forth and as claimed.

In the manufacture of calcium carbid in the electric furnace, the operation is a purely thermal one, the electric current serving merely as a heating agent. Substantially the action may be said to be the reduction of calcium oxid by carbon to form calcium and carbon monoxid and the subsequent union of the calcium with carbon to form the carbid; all of which reactions are strongly endothermic, absorbing many heat units. The degree of temperature in the operation must also be very high. It is usual to feed the electric furnace with lime rather than limestone since the decomposition of limestone to form lime is also an endothermic reaction and if it takes place in an electric furnace much additional heat must be furnished, requiring the use of additional current. The more heat can be economized in the whole operation, of course the less is the demand on the current for heating.

The present invention is more particularly concerned with methods of utilizing and saving the heat from the electric furnace, both that heat which is, so to speak rendered latent in the formation of carbon monoxid and that which goes off with the gases as sensible heat. For this purpose the hot combustible gas coming from the electric furnaces is directly burned in contact with limestone or other form of calcium carbonate to form lime to be used in such electric furnace. The hot gases coming from the furnace are burned directly in contact with the material to be calcined, freeing it of carbon dioxid and heating it up and the heated calcined material is delivered to the electric furnace. Both the sensible heat and the heat of combustion are utilized. The limestone is best treated in the powdered or granulated form in an inclined rotary kiln, where it is treated in the form of a tumbling, agitated, relatively thin traveling stream. In order to supplement the heat derived from the kiln gases, I ordinarily employ producer gas coming hot from a suitable producer. This has the additional function of somewhat lengthening the flame which the gas coming from the electric furnace would ordinarily give. This gas being formed in the absence of air is not diluted by nitrogen and is rich in carbon monoxid. A hot flame of strong carbon monoxid gas is apt to be short while the needs of the rotating kiln require a flame as long as may be. The relatively poor gas from the gas producer serves to lengthen the flame of the purer gas coming from the electric furnace. I preferably employ the waste heat from the rotary kiln in order to heat the air required for combustion therein, and I may also utilize a portion of this waste heat in heating the coke or carbon going into the electric furnace to produce calcium carbid.

In the accompanying drawings I have illustrated more or less diagrammatically one of the many embodiments of apparatus elements possible for use within the described process. To this apparatus I make no claim herein, it forming the subject matter of my Patent 888,610, granted May 26, 1908, upon my co-pending application Serial No. 345,751.

In this showing:—Figure 1 is a diagrammatic view, partly in side elevation and partly in section; Fig. 2 is an enlarged detail sectional view, partly broken away and partly sectioned, of a conveyer chamber with a conveyer therein, and with an air-heating jacket; Fig. 3 is a plan view of the apparatus illustrated in Fig. 1, with some of the upper parts omitted for the sake of clearness; and Fig. 4 is an enlarged detail vertical longitudinal section of one of the calcining furnaces.

In the showing, elements 1 and 2 are a pair of similar rotary kilns. A single kiln may be used or the number may be more than 2, but two form a convenient arrangement. Each of these kilns is of the ordinary form save as regards the hood at the mouth. They may be placed in motion by suitable means, such as the encircling gear 3 and pinion 4, driven by shaft 6 from any suitable source of power. The kiln may be operated in the usual manner by bearing bands 7 and 8 on suitable pillows 9 and 10. The kilns are respectively provided with bins or hoppers 11 and 12 for the continuous feed of raw material. From the bins the limestone may be taken into the kiln by any suitable means, as for instance, the screw conveyer 13, feeding another conveyer 14 which discharges material directly into the end of the kiln. At the lower end of the kiln is provided a stationary hood or combustion chamber 15 mounted on suitable supports 16. Combustible gas may be supplied it from gas producer 17 by the usual connections 18, 19 and 20. As shown, each kiln is provided with its own gas producer. A further supply of combustible gas is furnished to each combustion chamber by connections hereinafter specified. Returning to the kiln, at its lower end the calcined lime discharges through aperture 21 formed in a casing 22 located between the combustion chamber and the end of the kiln and carried on truck 23. These elements are fitted together to form as close a joint as may be between the combustion chamber, the housing and the end of the kiln.

The interior of the housing should be formed so that the bottom thereof will be substantially level or slightly inwardly and backwardly inclined over the bottom of the combustion chamber so as to avoid any tendency of the calcined material to pass beyond the discharge aperture 21 and enter the combustion chamber. The length of the combustion chamber is so proportioned with respect to the strength of the draft passing therethrough and to the character and volume of the heating gas consumed that the point of most perfect combustion will take place substantially at a point above the discharge aperture. By producing this correlation of dimensions, the hottest point in the flame will be immediately above the calcined lime at the point of discharge and the lime consequently will be extremely hot, and it will be suited for delivery to the electric furnace. Other things being equal, the hotter the materials are when delivered to the electric furnace in making calcium carbid the less is the quantity of current required.

Following the hot calcined lime from the kiln, it falls through hopper 24 past a controlling gate or valve 25, into a weighing machine 26. From the weighing machine it goes into a mixer 27. The coke or other carbon necessary for the charge is discharged from weighing machine 28 into the mixer. The coke is fed to the weighing machine by means of spout 29 from hopper 30. From the mixer the commingled coke and lime are taken to electric furnaces, shown diagrammatically as 31 and 32, where calcium carbid is produced.

In the production of calcium carbid, as stated, hot carbon monoxid is evolved and this is taken by uptake 33 to a main or manifold pipe 34. Exhauster 36 may be provided to facilitate this movement. As shown, the manifold communicates directly with the supply pipes leading from the gas producers to the combustion chambers, so that the hot rich gas from the electric furnaces can be commingled in any desired proportion with the poorer gas from the gas producers. Returning now to the kiln, it will be noted that the upper end enters a housing or dust chamber 37 provided with an uptake or stack 38, the latter allowing the products of combustion or any given proportion thereof to be discharged into the atmosphere if desired. The housing is also provided with an outlet 39, communicating with a manifold drum 40, common to the two kilns. From this drum hot gases may be led by a pipe or flue 41 to and through a horizontal chamber 42 to a stack or uptake 43. This horizontal chamber is inclosed and spaced away from a surrounding casing 44, serving as an air jacket. This air jacket as shown opens freely to the atmosphere at the end next the main stack of the kiln and at the other end communicates with a discharge flue 45 provided with a suitable fan or exhauster 46. This fan serves to pass the air heated in the jacket through pipes 47 and 48 to the burners of the combustion chambers. When it is desired to pass hot waste gases from the kilns through the horizontal chamber, the main stack of the kiln may be partially closed by a damper or valve 49. Similar dampers 50 and 51 may be employed in shutting off part of the waste heat from the drum.

The horizontal chamber so far as described has served merely as an air heating means but it may also be used as a means for affording heat to the carbon to be used in the electric furnace. While it is practically impossible to heat coke or other carbon to any very high temperature by a flame or products of combustion, since above a certain temperature carbon dioxid reacts with carbon to form carbon monoxid (the principle upon which the gas producer is based) yet heat short of this point may be imparted to the coke by the waste gases from the kiln. After having passed from the calcining limestone, the products of combustion are reduced in temperature below the danger point. As shown, within the horizontal chamber moves an endless conveyer 52 which may be of any suitable construction being, for instance, provided with the pockets 53 shown. This conveyer may be supplied from any suitable source as by conveyer 54 from discharge spout 55.

In the operation of the described apparatus, it will be seen that the electric furnaces are supplied with highly heated calcined lime and carbon which has separately been heated as highly as possible. In the electric furnace the hot lime and carbon are brought to the calcium carbid forming temperature by means of the electric current. Obviously, the more heat can be taken into the furnace with the raw materials the less is the heating duty imposed on the electric current. In the formation of calcium carbid, intensely hot carbon monoxid is formed and this carbon monoxid is directly led into the base of a rotary calcining kiln where it is burned with heated air to calcine limestone and furnish hot lime for delivery to the electric furnace, the flame conditions within the rotary kiln being in a measure regulated and controlled by the supply of producer gas from an ordinary producer. The waste heat from the calcining kiln is in part recovered as the sensible heat of air used to produce combustion in the kiln and in part is recovered as sensible heat of coke or other carbon to be fed into the electric furnace.

With the described arrangement not only is a maximum economy of heat and energy secured but also the calcined lime being directly delivered to the electric furnaces, has no opportunity of cooling or suffering deterioration by the absorption of carbon dioxid and moisture from the air.

What I claim is:—

1. In the manufacture of calcium carbid, the method which comprises heating lime and carbonaceous material in the presence of each other, but excluded from oxygen, to produce calcium carbid and combustible gas, removing the combustible gas, burning said gas with air to form a flame, calcining calcium carbonate with said flame to produce lime and heating said lime with carbonaceous material to produce carbid.

2. In the manufacture of calcium carbid, the method which comprises heating lime and carbonaceous material in the presence of each other to produce calcium carbid and combustible gas, mixing the resultant gas with air, burning the same in the presence of calcium carbonate to produce lime, preheating carbonaceous material with the resultant products of combustion and mixing the heated material with the lime.

3. In the manufacture of calcium carbid, the method which consists in subjecting calcium carbonate to the calcining influence of burning fluid fuel elements, moving the carbonate through the said elements in the opposite direction to that of their line of travel, removing the resultant lime from said elements at the point of most perfect combustion therein, mixing with the hot combustion lime thus obtained, while in its highly heated condition, a quantity of carbonaceous material, and subsequently heating the mixture to produce calcium carbid.

4. In the manufacture of calcium carbid, the method which comprises heating lime and carbonaceous material in the presence of each other, but excluded from oxygen, to produce calcium carbid and combustible gas, mixing the resultant gas with air, completely burning the same in the presence of calcium carbonate to produce lime, mixing the resultant lime while still heated above atmospheric temperature with carbonaceous material, and finally heating the mixture of lime and carbonaceous material to produce calcium carbid.

5. In the manufacture of calcium carbid, the method which comprises heating lime and carbonaceous material in the presence of each other to produce calcium carbid and combustible gas, removing and burning the resultant gas with air to form a flame, completely burning said flame in the presence of and in direct contact with calcium carbonate to produce lime and subjecting the lime with an admixture of carbon to a fusing degree of heat.

6. In the manufacture of calcium carbid, the method which comprises subjecting calcium carbonate to the calcining influence of burning fuel elements, removing the resultant lime from the influence of said elements at the point where the most perfect combustion occurs, mixing with the hot lime thus obtained, while in its highly heated condition, a quantity of previously heated carbonaceous material, and subsequently fusing the mixture to produce calcium carbid.

7. In the manufacture of calcium carbid, the method which comprises subjecting calcium carbonate to the calcining influence of a current of burning fluid fuel elements, moving the carbonate past said current in the opposite direction of its line of travel, removing the resultant lime from the influence of said current at the zone of highest temperatures and mixing the lime thus obtained and while heated above atmospheric temperature, with a quantity of carbonaceous material and subsequently fusing the mixture to produce calcium carbid.

8. The process of smelting divided refractory compounds, which consists in preheating a supported body of the material by passing hot combustion gases over its surface and agitating the material to expose fresh surfaces, and electrically heating the preheated material to the required temperature, as set forth.

9. The process of smelting divided refractory compounds, which consists in preheating a supported body of the material by passing hot gases over its surface and rotating the material to expose fresh surfaces, and electrically heating the preheated material to the required temperature, as set forth.

10. The process of smelting divided refractory compounds, which consists in preheating a supported body of the material by passing hot gases over its surface and agitating the material to expose fresh surfaces, delivering the preheated material to the smelting furnace and electrically heating it to the required temperature, and feeding fresh material into the preheated atmosphere, as set forth.

11. The process of smelting divided refractory material, which consists in preheating a supported body of the material by passing hot gases over its surface and rotating the material to expose fresh surfaces, delivering the preheated material to the smelting furnace and electrically heating it to the required temperature, and feeding fresh material into the preheating atmosphere, as set forth.

12. The process of smelting divided refractory compounds, which consists in preheating a supported body of material by passing hot combustion gases over its surface and agitating the material to expose fresh surfaces, collecting the preheated material into a body, and electrically heating said body to the required temperature, as set forth.

13. The process of smelting divided refractory compounds, which consists in preheating a supported body of the material by passing hot gases over its surface and rotating the material to expose fresh surfaces, collecting the preheated material into a body, and electrically heating said body to the required temperature, as set forth.

14. In the manufacture of calcium carbid, the process which comprises smelting a mixture of lime and carbon in an electrical furnace to produce calcium carbid and combustible gas, removing and completely burning the combustible gas in proximity to calcium carbonate to produce lime and transferring the hot lime to said furnace for conversion into carbid.

15. In the manufacture of calcium carbid, the process which comprises removing the combustible gases from an electrically heated carbid furnace, completely burning such gases as a flame in proximity to calcium carbonate to produce hot lime, mixing the hot lime with carbon and transferring the mixture to said furnace to aid in producing carbid and further quantities of combustible gas.

16. In the manufacture of calcium carbid, the process which comprises calcining calcium carbonate in a tumbling, relatively thin traveling stream with the aid of a completely burning flame of combustible gas from an electrically heated calcium carbid furnace, mixing the calcines with carbon and delivering the mixture into such furnace.

17. In the manufacture of calcium carbid, the process which comprises calcining calcium carbonate in a tumbling, relatively thin traveling stream and smelting the resultant calcines in an electrically heated carbid furnace, the combustible gases from said furnace being brought to a state of complete combustion and employed as a flame in proximity to said stream.

18. In the manufacture of calcium carbid, the process which comprises calcining calcium carbonate with a flame of a burning mixture of carbid-furnace gases and producer gas in proportions adjusted to form a long flame.

19. In the manufacture of calcium carbid, the process which comprises calcining calcium carbonate in a tumbling, relatively thin traveling stream with a flame of a burning mixture of carbid-furnace gases and producer gas.

In testimony whereof I have signed my name to this specification, in the presence of two subscribing witnesses, on this 27th day of November A. D. 1906.

HERMAN L. HARTENSTEIN.

Witnesses:
FRANCIS A. HOPKINS
CHAS. H. SEEM.